(12) United States Patent
Blunt et al.

(10) Patent No.: US 7,212,150 B2
(45) Date of Patent: May 1, 2007

(54) DOPPLER-SENSITIVE ADAPTIVE COHERENCE ESTIMATE DETECTOR METHODS

(75) Inventors: Shannon D. Blunt, Alexandria, VA (US); Karl R. Gerlach, Chesapeake Beach, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 244 days.

(21) Appl. No.: 11/110,736

(22) Filed: Apr. 21, 2005

(65) Prior Publication Data

US 2006/0238408 A1    Oct. 26, 2006

(51) Int. Cl.
G01S 13/534    (2006.01)
(52) U.S. Cl. .................. 342/91; 342/159; 342/162; 342/192
(58) Field of Classification Search .................. 342/91
See application file for complete search history.

(56) References Cited

U.S. PATENT DOCUMENTS

| 4,217,583 | A | * | 8/1980 | Hiller et al. | ................ | 342/149 |
| 4,355,368 | A | * | 10/1982 | Zeidler et al. | ............. | 708/422 |
| 5,233,354 | A | * | 8/1993 | Roth et al. | .................. | 342/160 |
| 5,235,339 | A | * | 8/1993 | Morrison et al. | ........... | 342/159 |
| 6,426,718 | B1 | * | 7/2002 | Ridgway | .................... | 342/160 |
| 6,756,935 | B1 | * | 6/2004 | Cameron et al. | ............. | 342/90 |

OTHER PUBLICATIONS

L.L. Scharf and B. Friedlander, "Matched subspace detectors," *IEEE Trans. Signal Processing*, vol. 42, No. 8, pp. 2146-2157, Aug. 1994.

L.L. Scharf and L.T. McWhorter, "Adaptive matched subspace detectors and adaptive coherence estimators," *Proc. 30th Asilomar Conf. on Signals, Systems, and Computers*, vol. 1, pp. 1114-1117, Nov. 3-6, 1996.

L.T. McWhorter, L.L. Scharf, and L.J. Griffiths, "Adaptive coherence estimation for radar signal processing," *Proc. 30th Asilomar Conf. on Signals, Systems, and Computers*, vol. 1, pp. 536-540, Nov. 3-6, 1996.

S. Kraut, L.L. Scharf, and L.T. McWhorter, "Adaptive subspace detectors," *IEEE Trans. Signal Processing*, vol. 49, No. 1, pp. 1-16, Jan. 2001.

K. Gerlach and S.D. Blunt, "Efficient reiterative censoring of robust STAP using the FRACTA algorithm," *Proc. IEEE International Radar Conference 2003* (5 pages).

J. Ward, "Space-Time Adaptive Processing for Airborne Radar", MIT Lincoln Lab Technical Report ESC-TR-94-109, Dec. 1994 (179 pages).

* cited by examiner

*Primary Examiner*—Thomas H. Tarcza
*Assistant Examiner*—Matthew M. Barker
(74) *Attorney, Agent, or Firm*—John J. Karasek; L. George Legg

(57) ABSTRACT

A method is provided for detecting a target signal of a specific known form in the presence of clutter. The method includes dividing a set of initial training data, derived from returns from a burst of identical pulses, into a set of censored data and a set of uncensored data. A covariance matrix estimate, based on the uncensored data, is used to compute adaptive coherence estimate values, and an average adaptive coherence estimate threshold level is computed for each Doppler band to obtain a corresponding threshold. The censored data and the covariance matrix estimate are used to compute adaptive coherence estimate values for the uncensored data for each Doppler band, and these values are compared with the respective thresholds to determine the presence or absence of the target signal.

22 Claims, 1 Drawing Sheet

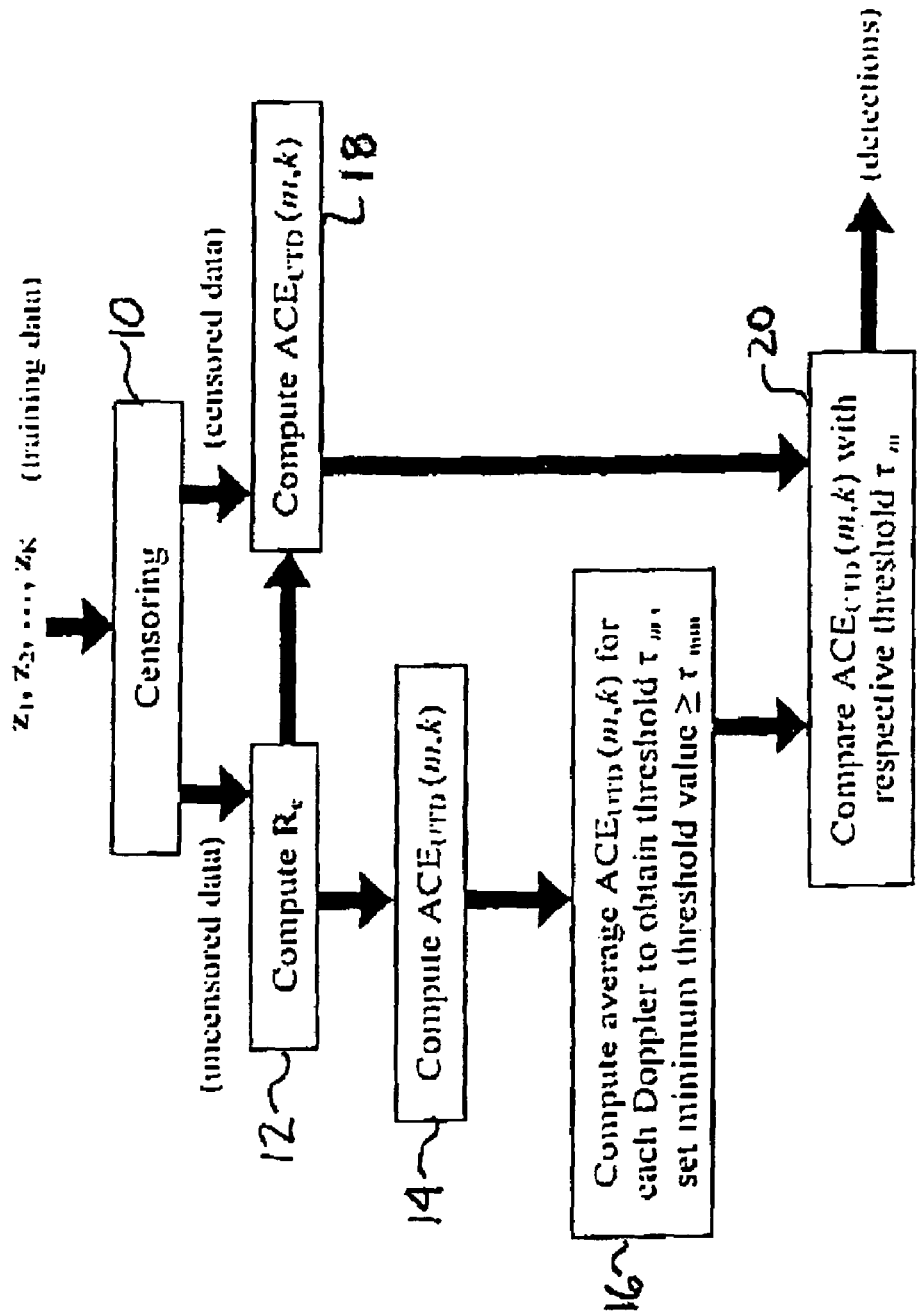

DOPPLER-SENSITIVE ADAPTIVE COHERENCE ESTIMATE DETECTOR METHODS

FIELD OF THE INVENTION

The present invention generally relates to adaptive coherence estimate detectors, particularly for, but not limited to, airborne radar applications.

BACKGROUND OF THE INVENTION

In applications such as radar, sonar, data communications, time series analysis, and array processing, an object is to determine whether a specific signal is present in a series of N measured data samples (which can be represented as $Z=[z(0), z(1), \ldots, z(N-1)]^T$) that contain unknown interference and noise. Based on these data samples, a decision must be made between two possible hypotheses, viz., the null hypothesis $H_0$ in which the data consists of interference only, and the alternate hypothesis $H_1$ in which the signal is present in the data as well. These two hypotheses are exemplified via the mathematical representation of the measured data samples:

$$z = \alpha s + n \qquad (1)$$

where s is the signal vector, with $\alpha$ is its associated complex amplitude, and n is the noise plus interference. Under hypothesis $H_0$, the signal amplitude is $\alpha=0$, whereas under hypothesis $H_1$, the signal amplitude is $\alpha \neq 0$. The covariance of the noise plus interference is R, which is employed in Matched Subspace Detectors (MSDs) to effectively suppress the noise and interference to enable reliable detection performance (as a function of the signal-to-noise ratio (SNR) and the separability of the signal and interference). (See, for example, L. L. Scharf and B. Friedlander, "Matched subspace detectors," *IEEE Trans. Signal Processing*, Vol. 42, No. 8, pp. 2146–2157, August 1994.) In practice, however, R is not known and must, therefore, be estimated. Hence, the detector performance is also highly dependent upon the accuracy of the covariance matrix estimate $\tilde{R}$. MSDs that use the estimated covariance matrix are known as Adaptive Subspace Detectors (ASDs) because they adapt to the measured data.

An Adaptive Coherence Estimate (ACE) detector, which is also known as an Adaptive Cosine Detector, is one such ASD in which the specific form of the desired signal is known (as opposed to detectors that test for the presence of any signal that lies within the signal subspace), but the power level of the noise and interference is unknown (see, e.g., L. L. Scharf and L. T. McWhorter, "Adaptive matched subspace detectors and adaptive coherence estimators," *Proc. 30$^{th}$ Asilomar Conf. on Signals, Systems, and Computers*, Vol. 1, pp. 1114–1117, Nov. 3–6, 1996; L. T. McWhorter, L. L. Scharf, and L. J. Griffiths, "Adaptive coherence estimation for radar signal processing," *Proc. 30$^{th}$ Asilomar Conf. on Signals, Systems, and Computers*, Vol. 1, pp. 536–540, Nov. 3–6, 1996; and S. Kraut, L. L. Scharf, and L. T. McWhorter, "Adaptive subspace detectors," *IEEE Trans. Signal Processing*, Vol. 49, No. 1, January 2001]). For each range index k the ACE takes the form $$ACE(k) = \frac{|s^H \tilde{R}^{-1} z_k|^2}{(s^H \tilde{R}^{-1} s)(z_k^H \tilde{R}^{-1} z_k)} \qquad (2)$$

wherein s, R and z are as defined above, and H denotes the Hermitian matrix or complex conjugate transpose. The resulting ACE value for a given data vector $z_k$ is then compared with a predetermined threshold to achieve a desired probability of false alarm. The ACE is bounded between 0 and 1 and effectively determines a measure of coherence of the cell-under-test (CUT) with the desired steering vector (that models a target return signal from the corresponding spatial direction and Doppler frequency).

SUMMARY OF THE INVENTION

Generally speaking, one aspect of the present invention concerns a method for selecting the threshold for the ACE detector, and, more particularly, in preferred embodiments, selecting the threshold for airborne radar applications in which a form of censored Space-Time Adaptive Processing (STAP) is employed. An important feature of preferred embodiments of the invention is that the coherent nature of the ACE test statistic thereby enables an appropriate threshold to be set for each individual Doppler frequency band, hence resulting in substantially improved target signal detection performance as compared with a conventional "uniform threshold across" Doppler system.

In accordance with one aspect of the invention, there is provided a method for selecting a threshold for an adaptive coherence estimate detector for an airborne radar application and detecting a target signal using the threshold wherein a specific form of a target signal to be detected is known, said method comprising the steps of:

determining a Doppler frequency for a clutter ridge of a clutter return from ground of a radar beam transmitted from an airborne radar antenna;

determining the proximity of a Doppler band of interest to the Doppler frequency of clutter ridge; and setting the threshold of the adaptive coherence estimate detector based on the proximity of the Doppler band of interest to the clutter ridge.

Preferably, target detection is based on returns from a burst of M identical pulses transmitted over N radio frequency channels, input data in the respective channels are sampled to form range cell samples for each pulse, snapshots are formed by stacking, in succession, N-length data vectors associated with each of the channels for each of the M pulses, signal presence is sought in one range cell at a time, the snapshots are censored so as to divide a set of K initial training data into (i) a set of $K_c$ censored training data snapshots that may potentially contain a target, and (ii) a set of $K_u$ uncensored training data snapshots, a covariance estimate is computed based on the uncensored snapshots, the covariance estimate is used in computing an adaptive coherence estimate values for the $K_c$ censored snapshots for each of the M Doppler frequency bands and in computing a quiescent adaptive coherence estimate threshold level for the $K_u$ uncensored snapshots for each of the M Doppler frequency bands, threshold levels so computed are averaged over the uncensored range cells to yield a M-length threshold vector wherein each vector element corresponds to the quiescent estimate level for a particular Doppler, and the adaptive coherence estimate values for the $K^c$ censored snapshots are compared with a corresponding quiescent estimate level to detect the presence or absence of a target signal.

Preferably, the covariance matrix estimate comprised of only the $K_u$ uncensored snapshots, denoted $\tilde{R}_c$, is used to compute the adaptive coherence estimate values, denoted $ACE_{CTD}(m,k_c)$, for the set of $k_c=1, 2 \ldots K_c$ censored training data snapshots, denoted $z_{CTD,k_c}$, for each of the m=1, 2, ..., M Doppler frequency bands, using a steering vector $s_m$ in accordance with the equation:

$$ACE_{CTD}(m, k_c) = \frac{|s_m^H \tilde{R}_c^{-1} z_{CTD,k_c}|^2}{(s_m^H \tilde{R}_c^{-1} s_m)(z_{CTD,k_c}^H \tilde{R}_c^{-1} z_{CTD,k_c})}$$

wherein H denotes the Hermitian matrix and $s_m$, $\tilde{R}_c$, and $z_{CTD,k_c}$ are defined as above Preferably, the covariance matrix estimate, denoted $\tilde{R}_c$, is used to compute the adaptive coherence estimate levels, denoted $ACE_{UTD}(m,k_u)$, for the set of $k_u=1, 2 \ldots K_u$ uncensored training data snapshots, denoted $z_{UTD,k_u}$, for each of the m=1, 2, ..., M Doppler frequency bands, using a steering vector $s_m$ in accordance with the equation:

$$ACE_{UTD}(m, k_u) = \frac{|s_m^H \tilde{R}_c^{-1} z_{UTD,k_u}|^2}{(s_m^H \tilde{R}_c^{-1} s_m)(z_{UTD,k_u}^H \tilde{R}_c^{-1} z_{UTD,k_u})}$$

wherein H denotes the Hermitian matrix, and $z_{UTD,k_u}$, $s_m$ and $\tilde{R}_c$ are defined as above.

Preferably, the M-length threshold vector, denoted $\gamma$, is computed using the equation:

$$\gamma = \begin{bmatrix} \frac{1}{K_u} \sum_{k_u=1}^{K_u} ACE_{UTD}(1, k_u) \\ M \\ \frac{1}{K_u} \sum_{k_u=1}^{K_u} ACE_{UTD}(M, k_u) \end{bmatrix}.$$

Advantageously, the quiescent adaptive coherence estimate threshold level is scaled to obtain a desired level of false alarms. The threshold is preferably scaled using a minimum desired threshold level. Advantageously, scaled threshold, denoted $\tau_m$, for the $m^{th}$ Doppler band is scaled as $\tau_m = \max(\beta\gamma_m, \tau_{min})$ wherein $\beta$ is a scale factor used to set a desired probability of false alarm which is constant over m=1, 2, ..., M, $\gamma_m$ is the value of the threshold for the $m^{th}$ Doppler, and $\tau_{min}$ is a minimum desired threshold level.

According to a further aspect of the invention, there is provided a method for detecting a signal of a specific known form in the presence of clutter, said method comprising:

dividing a set of initial training data derived from returns from a burst of identical pulses, into a set of censored data and a set of uncensored data;

using the uncensored data to compute a covariance matrix estimate;

using the covariance matrix estimate to compute adaptive coherence estimate values;

computing an average adaptive coherence estimate threshold for each Doppler band so as to obtain a threshold;

using the censored data of step (i) and the covariance matrix estimate of step (ii) to compute adaptive coherence estimate values for the uncensored data for each Doppler band; and comparing the adaptive coherence estimate values computed in step (v) with the respective thresholds computed in step (iv) to determine the presence or absence of the signal of a specific known form.

Preferably, as discussed above, the covariance matrix estimate, denoted $\tilde{R}_c$, is used to compute the adaptive coherence estimate values, denoted $ACE_{CTD}(m,k_c)$, for the set of $k_c=1, 2 \ldots K_c$ censored training data snapshots, denoted $Z_{CTD,k_c}$, for each of the m=1, 2, ..., M Doppler frequency bands, using a steering vector $s_m$ in accordance with the equation:

$$ACE_{CTD}(m, k_c) = \frac{|s_m^H \tilde{R}_c^{-1} z_{CTD,k_c}|^2}{(s_m^H \tilde{R}_c^{-1} s_m)(z_{CTD,k_c}^H \tilde{R}_c^{-1} z_{CTD,k_c})}.$$

wherein H denotes the Hermitian matrix and $s_m$, $\tilde{R}_c$, and $z_{CTD,k_c}$ are defined as above.

As was also discussed above, preferably, the covariance matrix estimate, denoted $\tilde{R}_c$, is used to compute the adaptive coherence estimate levels, denoted $ACE_{UTD}(m,k_u)$, for the set of $k_u=1, 2 \ldots K_u$ uncensored training data snapshots, denoted $z_{UTD,k_u}$, for each of the m=1, 2, ..., M Doppler frequency bands, using a steering vector $s_m$ in accordance with the equation:

$$ACE_{UTD}(m, k_u) = \frac{|s_m^H \tilde{R}_c^{-1} z_{UTD,k_u}|^2}{(s_m^H \tilde{R}_c^{-1} s_m)(z_{UTD,k_u}^H \tilde{R}_c^{-1} z_{UTD,k_u})}.$$

wherein H denotes the Hermitian matrix, and $z_{UTD,k_u}$, $s_m$ and $\tilde{R}_c$ are defined as above.

Preferably, the M-length threshold vector, denoted $\gamma$, is, computed using the equation:

$$\gamma = \begin{bmatrix} \frac{1}{K_u} \sum_{k_u=1}^{K_u} ACE_{UTD}(1, k_u) \\ M \\ \frac{1}{K_u} \sum_{k_u=1}^{K_u} ACE_{UTD}(M, k_u) \end{bmatrix}.$$

As discussed above, advantageously, the quiescent adaptive coherence estimate threshold level is scaled to obtain a desired level of false alarms. The threshold is preferably scaled using a minimum desired threshold level. Preferably, the scaled threshold, denoted $\tau_m$, for the $m^{th}$ Doppler band is scaled as $$\tau_m = \max(\beta\gamma_m, \tau_{min})$$

wherein $\beta$ is a scale factor used to set a desired probability of false alarm which is constant over m=1, 2, ..., M, $\gamma_m$ is the value of the threshold for the $m^{th}$ Doppler, and $\tau_{min}$ is a minimum desired threshold level.

In accordance with yet another aspect of the invention, there is provided a method for selecting a threshold for an adaptive coherence estimate detector and detecting a target signal using the threshold wherein a specific form of a target signal to be detected is known, said method comprising the steps of:

receiving returns from a burst of M identical pulses transmitted over N radio frequency channels, sampling input data in the respective channels to form range cell samples for each pulse, forming snapshots by stacking, in succession, N-length data vectors associated with each of the channels for each of the M pulses, censoring the snapshots so as to divide a set of K initial training data into (i) a set of $K^c$ censored training data snapshots that may potentially contain a target, and (ii) a set of $K^u$ uncensored training data snapshots, computing a covariance estimate based on the uncensored snapshots, using the covariance estimate in computing an adaptive coherence estimate values for the $K^c$ censored snapshots for each of the M Doppler frequency bands and in computing a quiescent adaptive coherence estimate threshold level for the $K^u$ uncensored snapshots for each of the M Doppler frequency bands, averaging the threshold levels so computed over the range cells corresponding to the uncensored snapshots to yield a M-length threshold vector wherein each vector element corresponds to the quiescent adaptive covariance estimate level for a particular Doppler; and comparing the adaptive coherence estimate values for the $K_c$ censored snapshots with corresponding adaptive coherence estimate quiescent levels to detect the presence or absence of the target signal.

Preferably, as discussed hereinabove, the covariance matrix estimate, denoted $\tilde{R}_c$, is used to compute the adaptive coherence estimate values, denoted $ACE_{CTD}(m, k_c)$, for the set of $k_c = 1, 2 \ldots K_c$ censored training data snapshots, denoted $z_{CTD,k_c}$, for each of the m=1, 2, ..., M Doppler frequency bands, using a steering vector $s_m$ in accordance with the equation:

$$ACE_{CTD}(m, k_c) = \frac{\left|s_m^H \tilde{R}_c^{-1} z_{CTD,k_c}\right|^2}{\left(s_m^H \tilde{R}_c^{-1} s_m\right)\left(z_{CTD,k_c}^H \tilde{R}_c^{-1} z_{CTD,k_c}\right)}.$$

wherein H denotes the Hermitian matrix and $s_m$, $\tilde{R}_c$, and $z_{CTD,k_c}$ are defined as above.

Again, preferably, the covariance matrix estimate, denoted $\tilde{R}_c$, is used to compute the adaptive coherence estimate levels, denoted $ACE_{UTD}(m, k_u)$, for the set of $k_u=1, 2 \ldots K_u$ uncensored training data snapshots, denoted $z_{UTD,k_u}$, for each of the m=1, 2, ..., M Doppler frequency bands, using a steering vector $s_m$ in accordance with the equation:

$$ACE_{UTD}(m, k_u) = \frac{\left|s_m^H \tilde{R}_c^{-1} z_{UTD,k_u}\right|^2}{\left(s_m^H \tilde{R}_c^{-1} s_m\right)\left(z_{UTD,k_u}^H \tilde{R}_c^{-1} z_{UTD,k_u}\right)}.$$

wherein H denotes the Hermitian matrix, and $Z_{UTD,k_u}$, $s_m$ and $\tilde{R}_c$ are defined as above.

Preferably, as discussed hereinbefore, the M-length threshold vector, $\gamma$, is computed using the equation:

$$\gamma = \begin{bmatrix} \frac{1}{K_u} \sum_{k_u=1}^{K_u} ACE_{UTD}(1, k_u) \\ M \\ \frac{1}{K_u} \sum_{k_u=1}^{K_u} ACE_{UTD}(M, k_u) \end{bmatrix}.$$

Again, the quiescent adaptive coherence estimate threshold level is preferably scaled to obtain a desired level of false alarms, the threshold is preferably scaled using a minimum desired threshold level, and most preferably, the scaled threshold, denoted $\tau_m$, for the $m^{th}$ Doppler band is scaled as $$\tau_m = \max(\beta\gamma_m, \tau_{min})$$

wherein $\beta$ is a scale factor used to set a desired probability of false alarm which is constant over m=1, 2, ..., M, $\gamma_m$ is the value of the threshold for the $m^{th}$ Doppler, and $\tau_{min}$ is a minimum desired threshold level.

Further features and advantages of the present invention will be set forth in, or apparent from, the detailed description of preferred embodiments thereof which follows.

BRIEF DESCRIPTION OF THE DRAWINGS

The single FIGURE in the drawings is a flow chart or block diagram of the basic steps employed in a detection method in accordance with a preferred embodiment of the invention.

DESCRIPTION OF THE PREFERRED EMBODIMENTS

Considering some additional-background in connection with embodiments directed to radar applications, the Pulse Repetition Frequency (PRF) of the radar pulse scan determines the bandwidth of the Doppler frequency spectrum. The Doppler spectrum is partitioned into M frequency bands (for M consecutive pulses) in which targets are sought at each individual range gate of the radar platform by using the steering vector $s_m$ associated with the $m^{th}$ Doppler frequency band. For airborne radar performing Ground Moving Target Indication (GMTI), the returns from the ground, also know as clutter returns, are a major source of interference. For an antenna array beam focused at a particular azimuth angle and depression angle with respect to the motion of the radar platform, the clutter returns are received at a prescribed Doppler frequency which can be approximately calculated given the radar operating parameters.

The power level of the clutter return dictates to a large degree the threshold level for the ACE detector, according to the proximity to the clutter Doppler of a Doppler frequency band of interest. This can be illustrated by assuming the clutter return is comprised of a single Doppler frequency such that the measured data vector at a range cell that does contain a target can be modeled as $z_c = \alpha s_c$, where $s_c$ is the steering vector of the clutter and $\alpha$ is a scaling factor (assuming for the sake of simplicity that the clutter is not spread in Doppler as actually occurs in practice). If the ACE value is then computed at the Doppler frequency associated with $s_c$, it is not difficult to show that equation (2) above will result in an ACE value that is identically 1. One aspect of the present invention provides for setting the ACE threshold higher according to the proximity to the clutter ridge of a Doppler band of interest. In other words, the closer the clutter ridge to the Doppler band of interest, the higher the ACE threshold should be set. As discussed below, a further aspect of the invention concerns also setting a minimum for the ACE threshold so that the ACE threshold for Doppler bands further away from the clutter ridge is not less than a predetermined minimum.

In order to provide a better understanding of the invention, consider a radar system that consists of an N-element antenna array which provides N Radio Frequency (RF) antenna channels. Time-delayed inputs of the N channels are to be combined via linear weighting to form an output such that an output performance measure (such as signal-to-noise (SNR) power ratio) is optimized. Assume that for each of these RF channels, the radar front end carries out amplification, filtering, reduction to baseband, and analog-to-digital (A/D) conversion. The output of each A/D is a data stream of in-phase and quadrature-phase (I, Q) output pairs. The I and Q components represent the real and imaginary parts, respectively, of the complex valued data stream.

The radar waveform is assumed to be a burst of M identical pulses with pulse repetition interval (PRI) equal to T. Target detection is based upon the returns from this burst. The input data in the respective channels are sampled to form range-gate samples for each pulse. For the $k^{th}$ range gate, an MN-length sample vector $z_k$ is formed. In particular, this vector, which is called a snapshot, is formed by stacking, in succession, the N-length data vectors associated with each of the antenna channels for each of the M pulses. Signal presence is sought in one range gate at a time and, as indicated above, the particular range gate at which signal presence is sought is called the cell-under-test (CUT).

In accordance with an important feature of preferred embodiments of the invention, the local snapshots (in terms of range) that may potentially contain a target are censored such that the set of K initial training data (ITD) snapshots are separated into a set of $K_c$ censored training data (CTD) snapshots and a set of $K_u$ uncensored training data (UTD) snapshots. More generally, the data are split into two kinds of training data, censored and uncensored. In preferred embodiments, this is done using APR (Adaptive Power Residue) techniques wherein targets are sought that match a particular space-time training vector, or GIP which essentially involves looking for statistical outliers. Both of these techniques are conventional.

As a consequence of splitting the data as described above, two covariance matrix estimates can be computed, viz., $\tilde{R}_u$, the ITD covariance matrix estimate comprised of both censored and uncensored local snapshots, and $\tilde{R}_c$, the UTD covariance matrix estimate comprised of only the uncensored local snapshots. In preferred embodiments of the invention, only the UTD covariance matrix estimate $\tilde{R}_c$ is used. Specifically, the UTD covariance matrix estimate $\tilde{R}_c$ is employed in equation (2) above to compute the ACE values for the block of $k_c = 1, 2, \ldots, K_c$ local censored snapshots $z_{CTD,k_c}$ for each of the $m=1, 2, \ldots, M$ Doppler frequency bands using the associated steering vector $s_m$ using the equation $$ACE_{CTD}(m, k_c) = \frac{|s_m^H \tilde{R}_c^{-1} z_{CTD,k_c}|^2}{(s_m^H \tilde{R}_c^{-1} s_m)(z_{CTD,k_c}^H \tilde{R}_c^{-1} z_{CTD,k_c})} \quad (3)$$

wherein the various quantities are defined as discussed above. It is this range value that is to be compared with the ACE threshold to determine if a target exists at the particular range cell.

To determine the level of the ACE threshold, a quiescent ACE level is computed which corresponds to the $H_0$ hypothesis where no target is present. This is accomplished by determining the ACE values for the block of $k_u = 1, 2, \ldots, K_u$ local uncensored snapshots $z_{UTD,k_u}$ for each of the $m=1, 2, \ldots, M$ Doppler frequency bands as $$ACE_{UTD}(m, k_u) = \frac{|s_m^H \tilde{R}_c^{-1} z_{UTD,k_u}|^2}{(s_m^H \tilde{R}_c^{-1} s_m)(z_{UTD,k_u}^H \tilde{R}_c^{-1} z_{UTD,k_u})} \quad (4)$$

wherein, again, the various quantities are defined as discussed above.

More generally, equation (4), which employs the uncensored snapshots, is used to determine the level of the ACE threshold. Equation (3), which employs the censored snapshots, is used to derive the range value to be compared with the ACE threshold.

It is noted that this approach is different from the way in which the CFAR test statistic is computed (see K. Gerlach and S. D. Blunt, "Efficient reiterative censoring of robust STAP using the FRACTA algorithm," *Proc. IEEE International Radar Conference* 2003 and S. D. Blunt and K. Gerlach, "Efficient robust adaptive matched filtering using the FRACTA algorithm: results from KASSPER I," submitted to *IEEE Trans. AES*) wherein the quiescent level is determined using the ITD covariance matrix $\tilde{R}_u$ so that target Adaptive Power Residues (APRs) stand our more from the background interference.

After the computations set forth above are completed, the local UTD ACEs for each Doppler are averaged over the uncensored range cells to yield the M-length threshold vector $$\gamma = \begin{bmatrix} \frac{1}{K_u} \sum_{k_u=1}^{K_u} ACE_{UTD}(1, k_u) \\ \vdots \\ \frac{1}{K_u} \sum_{k_u=1}^{K_u} ACE_{UTD}(M, k_u) \end{bmatrix} \quad (5)$$

in which each element of the vector corresponds to the quiescent ACE for a particular Doppler frequency band and will lie between 0 and 1.

In order to obtain the desired level of false alarm, the ACE threshold for the $m^{th}$ Doppler is scaled as $$\tau_m = \max(\beta \gamma_m, \tau_{min}) \quad (6)$$

where $\beta$ is a scale factor to set the desired probability of false alarm which is constant over $m=1, 2, \ldots, M$, $\gamma_m$ is the $m^{th}$ term of $\gamma$ and $\tau_{min}$ is the minimum desired threshold level. As indicated above, although the ACE threshold should be set at a high level near the clutter ridge or peak, it is desirable that the threshold not be set too low, and thus the ACE threshold is scaled as set forth in equation (6) so as to not fall below $\tau_{min}$, which, as noted above, is the minimum value of the threshold.

The foregoing may perhaps be better understood by referring to the single FIGURE of the drawings which is a flow chart or block diagram of a preferred embodiment of the invention, and is used to summarize the steps of the method described above. As shown, in a first, censoring step 10, the training data $z., z_2, \ldots, z_k$ is divided or split into uncensored data and censored data, as described above.

As indicated by step or block 12 at the right in the drawings, the uncensored data is used to compute $\tilde{R}_c$, the UTD covariance matrix-estimate which, as shown by step or block 14, is, in turn, used to compute $ACE_{UTD}(m,k)$, wherein there are $m=1, \ldots M$ Doppler bands or bins, and there are $k=1, \ldots, K$ range cells. This is done using equation (4) above, in the manner described hereinbefore.

As shown by step or block 16, the result or output of step 14 is used to compute the average $ACE_{UTD}(m,k)$ for each Doppler to obtain the threshold $\tau_m$, with a minimum threshold value greater or equal to $\tau_{min}$. This involves the use of equations (5) and (6) above.

In a parallel step or process indicated at 18, the computed value for $\tilde{R}_c$ produced by step 12 is used together with censored data produced by step 10 to compute the adaptive coherence estimate values for the censored local snapshots $k_c=1, 2 \ldots K_c$ for each of the Doppler frequency bands or bins $m=1, 2, \ldots, M$, i.e., to compute $ACE_{CTD}(m,k)$, using equation (3) above.

Finally, as shown by step or block 20, the results of step 18, i.e., the $ACE_{CTD}(m,k)$ values, are compared with the respective thresholds $\tau_m$ to detect for the presence of targets, i.e., to determine whether any targets are present based on whether the $ACE_{CTD}$ value exceeds the corresponding $\tau_m$.

This overall method is referred to herein for shorthand purposes as the Doppler Sensitive-ACE (DS-ACE). An important advantage of DS-ACE thresholding is that targets at Doppler frequencies outside of the clutter spectrum are more easily detectable than with uniform thresholding of the ACE in Doppler. Furthermore, unlike uniform thresholding, DS-ACE is a straightforward automatic technique. The use of censored and uncensored training data sets produces more accurate covariance and resulting quiescent level estimations than does standard STAP which performs no censoring of the data. This has been verified using a validated high-fidelity clutter model wherein the automatic DS-ACE threshold method of the invention was found to detect nearly double the number of targets detected by uniform ACE thresholding that is set using trial-and-error techniques.

Although the invention has been described above in relation to preferred embodiments thereof, it will be understood by those skilled in the art that variations and modifications can be effected in these preferred embodiments without departing from, the scope and spirit of the invention.

What is claimed:

1. A method for selecting a threshold for an adaptive coherence estimate detector for an airborne radar application and detecting a target signal using the threshold wherein a specific form of a target signal to be detected is known, said method comprising the steps of:
   determining a Doppler frequency for a clutter ridge of a clutter return from ground of a radar beam transmitted from an airborne radar antenna;
   determining the proximity of a Doppler band of interest to the Doppler frequency of clutter ridge; and
   setting the threshold of the adaptive coherence estimate detector based on the proximity of the Doppler band of interest to the clutter ridge.

2. A method according to claim 1 wherein target detection is based on returns from a burst of M identical pulses transmitted over N radio frequency channels,
   wherein input data in the respective channels are sampled to form range cell samples for each pulse,
   wherein snapshots are formed by stacking, in succession, N-length data vectors associated with each of the channels for each of the M pulses,
   wherein signal presence is sought in one range cell at a time,
   wherein the snapshots are censored so as to divide a set of K initial training data into (i) a set of $K_c$ censored training data snapshots that may potentially contain a target, and (ii) a set of $K_u$ uncensored training data snapshots,
   wherein a covariance estimate is computed based on the uncensored snapshots,
   wherein the covariance estimate is used in computing an adaptive coherence estimate values for the $K_c$ censored snapshots for each of the M Doppler frequency bands and in computing a quiescent adaptive coherence estimate threshold level for the $K_u$ uncensored snapshots for each of the M Doppler frequency bands,
   wherein threshold levels so computed are averaged over the uncensored range cells to yield a M-length threshold vector wherein each vector element corresponds to the quiescent estimate level for a particular Doppler; and
   wherein the adaptive coherence estimate values for the $K_c$ censored snapshots are compared with a corresponding quiescent estimate level to detect the presence or absence of a target signal.

3. A method according to claim 2 wherein the covariance matrix estimate, denoted $\tilde{R}_c$, is used to compute the adaptive coherence estimate values, denoted $ACE_{CTD}(m,k_c)$, for the set of $k_c=1, 2 \ldots K_c$ censored training data snapshots, denoted $z_{CTD,k_c}$, for each of the $m=1, 2, \ldots, M$ Doppler frequency bands, using a steering vector $s_m$ in accordance with the equation:

$$ACE_{CTD}(m, k_c) = \frac{\left|s_m^H \tilde{R}_c^{-1} z_{CTD,k_c}\right|^2}{\left(s_m^H \tilde{R}_c^{-1} \boldsymbol{S}_m\right)\left(z_{CTD,k_c}^H \tilde{R}_c^{-1} z_{CTD,k_c}\right)}$$

wherein H denotes the Hermitian matrix and $s_m$, $\tilde{R}_c$, and $z_{CTD,k_c}$ are defined as above.

4. A method according to claim 2 wherein the covariance matrix estimate, denoted $\tilde{R}_c$, is used to compute the adaptive coherence estimate levels, denoted $ACE_{UTD}(m,k_u)$, for the set of $k_u=1, 2 \ldots K_u$ uncensored training data snapshots, denoted $z_{UTD,k_u}$, for each of the $m=1, 2, \ldots, M$ Doppler frequency bands, using a steering vector $s_m$ in accordance with the equation:

$$ACE_{UTD}(m, k_u) = \frac{\left|s_m^H \tilde{R}_c^{-1} z_{UTD,k_u}\right|^2}{\left(s_m^H \tilde{R}_c^{-1} \boldsymbol{S}_m\right)\left(z_{UTD,k_u}^H \tilde{R}_c^{-1} z_{UTD,k_u}\right)}$$

wherein H denotes the Hermitian matrix, and $z_{UTD,k_u}$, $s_m$ and $\tilde{R}_c$ are defined as above.

5. A method according to claim 4 wherein said M-length threshold vector, denoted $\gamma$, is computed using the equation:

$$\gamma = \begin{bmatrix} \dfrac{1}{K_u}\sum\limits_{k_u=1}^{K_u} ACE_{UTD}(1, k_u) \\ M \\ \dfrac{1}{K_u}\sum\limits_{k_u=1}^{K_u} ACE_{UTD}(M, k_u) \end{bmatrix}.$$

6. A method according to claim 5 wherein the quiescent adaptive coherence estimate threshold level is scaled to obtain a desired level of false alarms.

7. A method according to claim 6 wherein the threshold is scaled using a minimum desired threshold level.

8. A method according to claim 7 wherein the scaled threshold, denoted $\tau_m$, for the $m^{th}$ Doppler band is scaled as $$\tau_m = \max(\beta\gamma_m, \tau_{min})$$

wherein $\beta$ is a scale factor used to set a desired probability of false alarm which is constant over m=1, 2, ..., M, $\gamma_m$ is the value of the threshold for the $m^{th}$ Doppler, and $\tau_{min}$ is a minimum desired threshold level.

9. A method for detecting a signal of a specific known form in the presence of clutter, said method comprising:
  (i) dividing a set of initial training data derived from returns from a burst of identical pulses, into a set of censored data and a set of uncensored data;
  (ii) using the uncensored data to compute a covariance matrix estimate;
  (iii) using the covariance matrix estimate to compute adaptive coherence estimate values;
  (iv) computing an average adaptive coherence estimate threshold for each Doppler band so as to obtain a threshold;
  (v) using the censored data of step (i) and the covariance matrix estimate of step (ii) to compute adaptive coherence estimate values for the uncensored data for each Doppler band; and
  (vi) comparing the adaptive coherence estimate values computed in step (v) with the respective thresholds computed in step (iv) to determine the presence or absence of the signal of a specific known form.

10. A method according to claim 9 wherein the covariance matrix estimate, denoted $\tilde{R}_c$, is used to compute the adaptive coherence estimate values, denoted $ACE_{CTD}(m,k_c)$, for the set of $k_c=1, 2 \ldots K_c$ censored training data snapshots, denoted $z_{CTD,k_c}$, for each of the m=1, 2, ..., M Doppler frequency bands, using a steering vector $s_m$ in accordance with the equation:

$$ACE_{CTD}(m, k_c) = \frac{\left|s_m^H \tilde{R}_c^{-1} z_{CTD,k_c}\right|^2}{\left(s_m^H \tilde{R}_c^{-1} s_m\right)\left(z_{CTD,k_c}^H \tilde{R}_c^{-1} z_{CTD,k_c}\right)}$$

wherein H denotes the Hermitian matrix and $s_m$, $\tilde{R}_c$, and $z_{CTD,k_c}$ are defined as above.

11. A method according to claim 9 wherein the covariance matrix estimate, denoted $\tilde{R}_c$, is used to compute the adaptive coherence estimate levels, denoted $ACE_{UTD}(m,k_u)$, for the set of $k_u=1, 2 \ldots K_u$ uncensored training data snapshots, denoted $z_{UTD,k_u}$, for each of the m=1, 2, ..., M Doppler frequency bands, using a steering vector $s_m$ in accordance with the equation:

$$ACE_{UTD}(m, k_u) = \frac{\left|s_m^H \tilde{R}_c^{-1} z_{UTD,k_u}\right|^2}{\left(s_m^H \tilde{R}_c^{-1} s_m\right)\left(z_{UTD,k_u}^H \tilde{R}_c^{-1} z_{UTD,k_u}\right)}$$

wherein H denotes the Hermitian matrix, and $z_{UTD,k_u}$, $s_m$ and $\tilde{R}_c$ are defined as above.

12. A method according to claim 11 wherein said M-length threshold vector, denoted $\gamma$, is computed using the equation:

$$\gamma = \begin{bmatrix} \dfrac{1}{K_u}\sum\limits_{k_u=1}^{K_u} ACE_{UTD}(1, k_u) \\ M \\ \dfrac{1}{K_u}\sum\limits_{k_u=1}^{K_u} ACE_{UTD}(M, k_u) \end{bmatrix}.$$

13. A method according to claim 12 wherein the quiescent adaptive coherence estimate threshold level is scaled to obtain a desired level of false alarms.

14. A method according to claim 13 wherein the threshold is scaled using a minimum desired threshold level.

15. A method according to claim 14 wherein the scaled threshold, denoted $\tau_m$, for the $m^{th}$ Doppler band is scaled as $$\tau_m = \max(\beta\gamma_m, \tau_{min})$$

wherein $\beta$ is a scale factor used to set a desired probability of false alarm which is constant over m=1, 2, ..., M, $\gamma_m$ is the value of the threshold for the $m^{th}$ Doppler, and $\tau_{min}$ is a minimum desired threshold level.

16. A method for selecting a threshold for an adaptive coherence estimate detector and detecting a target signal using the threshold wherein a specific form of a target signal to be detected is known, said method comprising the steps of:
  receiving returns from a burst of M identical pulses transmitted over N radio frequency channels,
  sampling input data in the respective channels to form range cell samples for each pulse,
  forming snapshots by stacking, in succession, N-length data vectors associated with each of the channels for each of the M pulses,
  censoring the snapshots so as to divide a set of K initial training data into (i) a set of $K_c$ censored training data snapshots that may potentially contain a target, and (ii) a set of $K_u$ uncensored training data snapshots,
  computing a covariance estimate based on the uncensored snapshots,
  using the covariance estimate in computing an adaptive coherence estimate values for the $K_c$ censored snapshots for each of the M Doppler frequency bands and in computing a quiescent adaptive coherence estimate threshold level for the $K_u$ uncensored snapshots for each of the M Doppler frequency bands,
  averaging the threshold levels so computed over the range cells corresponding to the uncensored snapshots to yield a M-length threshold vector wherein each vector element corresponds to the quiescent adaptive coherence estimate level for a particular Doppler; and comparing the adaptive coherence estimate values for the $K_c$ censored snapshots with corresponding adaptive coherence estimate quiescent levels to detect the presence or absence of the target signal.

17. A method according to claim 16 wherein the covariance matrix estimate, denoted $\tilde{R}_c$, is used to compute the adaptive coherence estimate values, denoted $ACE_{CTD}(m,k_c)$, for the set of $k_c=1, 2 \ldots K_c$ censored training data snapshots, denoted $Z_{CTD,k_c}$, for each of the $m=1, 2, \ldots, M$ Doppler frequency bands, using a steering vector $s_m$ in accordance with the equation:

$$ACE_{CTD}(m, k_c) = \frac{\left| s_m^H \tilde{R}_c^{-1} z_{CTD,k_c} \right|^2}{\left( s_m^H \tilde{R}_c^{-1} S_m \right)\left( z_{CTD,k_c}^H \tilde{R}_c^{-1} z_{CTD,k_c} \right)}$$

wherein H denotes the Hermitian matrix and $s_m$, $\tilde{R}_c$, and $z_{CTD,k_c}$ are defined as above.

18. A method according to claim 16 wherein the covariance matrix estimate, denoted $\tilde{R}_c$ is used to compute the adaptive coherence estimate levels, denoted $ACE_{UTD}(m,k_u)$, for the set of $k_u=1, 2 \ldots K_u$ uncensored training data snapshots, denoted $z_{UTD,k_u}$, for each of the $m=1, 2, \ldots, M$ Doppler frequency bands, using a steering vector $s_m$ in accordance with the equation:

$$ACE_{UTD}(m, k_u) = \frac{\left| s_m^H \tilde{R}_c^{-1} z_{UTD,k_u} \right|^2}{\left( s_m^H \tilde{R}_c^{-1} s_m \right)\left( z_{UTD,k_u}^H \tilde{R}_c^{-1} z_{UTD,k_u} \right)}.$$

wherein H denotes the Hermitian matrix, and $Z_{UTD,k_u}$, $s_m$ and $\tilde{R}_c$ are defined as above.

19. A method according to claim 18 wherein said M-length threshold vector, $\gamma$, is computed using the equation:

$$\gamma = \begin{bmatrix} \frac{1}{K_u} \sum_{k_u=1}^{K_u} ACE_{UTD}(1, k_u) \\ M \\ \frac{1}{K_u} \sum_{k_u=1}^{K_u} ACE_{UTD}(M, k_u) \end{bmatrix}.$$

20. A method according to claim 19 wherein the quiescent adaptive coherence estimate threshold level is scaled to obtain a desired level of false alarms.

21. A method according to claim 20 wherein the threshold is scaled using a minimum desired threshold level.

22. A method according to claim 21 wherein the scaled threshold, denoted $\tau_m$, for the $m^{th}$ Doppler band is scaled as $$\tau_m = \max(\beta \gamma_m, \tau_{min})$$

wherein $\beta$ is a scale factor used to set a desired probability of false alarm which is constant over $m=1, 2, \ldots, M$, $\gamma_m$ is the value of the threshold for the $m^{th}$ Doppler, and $\tau_{min}$ is a minimum desired threshold level.

* * * * *